(12) United States Patent
Glassen et al.

(10) Patent No.: US 6,963,940 B1
(45) Date of Patent: Nov. 8, 2005

(54) MEASURING UTILIZATION OF INDIVIDUAL COMPONENTS OF CHANNELS

(75) Inventors: Steven G. Glassen, Wallkill, NY (US); Marten J. Halma, Poughquag, NY (US); Eugene P. Hefferon, Poughkeepsie, NY (US); Allan S. Meritt, Poughkeepsie, NY (US); Kenneth J. Oakes, Wappingers Falls, NY (US); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/539,024

(22) Filed: Mar. 30, 2000

(51) Int. Cl.$^7$ .............................................. G06F 13/00
(52) U.S. Cl. ........................ 710/107; 710/62; 710/18; 714/47
(58) Field of Search .................... 710/15, 240, 107, 710/110, 117, 305, 311, 18, 62, 100, 19; 714/47; 769/226; 324/73.1

(56) References Cited

U.S. PATENT DOCUMENTS

| | | | |
|---|---|---|---|
| 3,599,091 A * | 8/1971 | Warner, Jr. ................. | 324/72.5 |
| 4,149,241 A * | 4/1979 | Patterson ..................... | 710/107 |
| 4,155,117 A * | 5/1979 | Mitchell et al. .............. | 710/62 |
| 4,367,525 A * | 1/1983 | Brown et al. ................. | 710/18 |
| 4,485,440 A * | 11/1984 | Duff et al. .................... | 713/600 |
| 4,497,022 A * | 1/1985 | Cormier et al. ............... | 714/47 |
| 4,556,841 A * | 12/1985 | Carlson ....................... | 324/73.1 |
| 4,845,615 A * | 7/1989 | Blasciak ....................... | 714/10 |
| 5,253,344 A * | 10/1993 | Bostick et al. ................. | 710/8 |
| 5,265,240 A * | 11/1993 | Galbraith et al. ............. | 710/15 |
| 5,297,274 A * | 3/1994 | Jackson ........................ | 703/22 |
| 5,473,665 A * | 12/1995 | Hall et al. ................ | 379/27.01 |
| 5,526,484 A | 6/1996 | Casper et al. .......... | 395/200.14 |
| 5,625,811 A * | 4/1997 | Bhide et al. .................... | 707/2 |
| 5,661,778 A * | 8/1997 | Hall et al. ................ | 379/29.01 |
| 5,689,691 A * | 11/1997 | Mann .......................... | 713/502 |
| 5,835,702 A * | 11/1998 | Levine et al. ................. | 714/39 |
| 5,896,552 A * | 4/1999 | Kowert et al. ................ | 710/55 |
| 5,913,043 A * | 6/1999 | Carter et al. ................ | 710/100 |
| 5,919,268 A * | 7/1999 | McDonald .................... | 714/47 |
| 5,991,708 A * | 11/1999 | Levine et al. ............... | 702/186 |
| 6,018,803 A * | 1/2000 | Kardach ...................... | 713/323 |
| 6,122,693 A * | 9/2000 | Gutta et al. ................. | 710/107 |
| 6,279,039 B1 * | 8/2001 | Bhat et al. ................... | 709/226 |
| 6,715,011 B1 * | 3/2004 | Buckland et al. ........... | 710/100 |
| 6,718,403 B2 * | 4/2004 | Davidson et al. ............. | 710/19 |

OTHER PUBLICATIONS

Ron Lee, "Introduction to the Test Workload", Novell, 1993, http://developer.novell.com/research/appnotes/1993/july/02/02.htm.*

Richard J. Larsen, Morris L. Marx, "An Introduction to Mathemathical Statistics and its Application", 1986, Prentice-Hall, 2$^{nd}$ Ed..*

Peter Monsen, "Theoretical and Measured Performance of a DFE Modem on a Fading Multiplath Channel", 1977, IEEE Transactions on Communications, vol. Com-25, No. 10.*

* cited by examiner

*Primary Examiner*—Glenn A. Auve
*Assistant Examiner*—Justin I. King
(74) *Attorney, Agent, or Firm*—Eugene I. Shkurko, Esq.; Blanche E. Schiller, Esq.; Heslin Rothenberg Farley & Mesiti P.C.

(57) ABSTRACT

The utilization of various individual components of a channel is determined in order to learn which portion of a channel is busy and to what extent that portion is busy. The determination of a component's utilization is dependent on the type of component, as well as the operational characteristics of that component.

51 Claims, 11 Drawing Sheets

MEASURING UTILIZATION OF INDIVIDUAL COMPONENTS OF CHANNELS

TECHNICAL FIELD

This invention relates, in general, to channel subsystems and, in particular, to measuring utilization of individual components of channels of a channel subsystem.

BACKGROUND ART

Historically, the determination of channel utilization has been important for capacity planning, problem analysis, as well as for performance monitoring. Previously, the utilization of a channel path has been measured by accumulating the amount of time that a channel is busy during predefined time intervals. These measurements indicate how busy a channel was during each interval, and based on the measurements, work management and planning decisions were made.

With the advent of more complex channels (e.g., FICON (Fibre Connections) channels offered by International Business Machines Corporation), the previous techniques for measuring channel utilization are inadequate. This is because the new channels are considered a collection of resources and an indication of the channel being busy does not indicate in what capacity it is busy. Thus, a need exists for an improved measurement of channel utilization. In particular, a need exists for a capability that indicates what portion of the channel is busy and the particular utilization of that channel portion.

SUMMARY OF THE INVENTION

The shortcomings of the prior art are overcome and additional advantages are provided through the provision of a method of determining utilization of channel components of a computing environment. The method includes, for instance, obtaining measurement data for a selected component of a channel, in which the channel includes a plurality of components; and using the measurement data to determine utilization of the selected component.

In one example, the method further includes obtaining one or more operational characteristics of the selected component, and in yet a further example, the one or more operational characteristics are used in determining the utilization of the selected component.

In a further aspect of the present invention, a method of obtaining information associated with channel components of a computing environment is provided. The method includes, for instance, selecting a channel within the computing environment to be monitored, the channel including a plurality of components; and obtaining data on one or more components of the plurality of components.

In one example, the obtaining data includes obtaining one or more operational characteristics of the one or more components. In a further example, the obtaining data includes obtaining measurement data usable in determining utilization of the one or more components.

In yet a further aspect of the present invention, a method of determining utilization of channels of a computing environment, in which the computing environment includes a plurality of logical partitions, is provided. The method includes, for instance, obtaining measurement data for a channel, and using the measurement data to determine utilization of the channel. The measurement data is representative of use of the channel by the logical partition involved in determining the utilization and of use by one or more other logical partitions of the plurality of logical partitions.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, channel utilization is measured. In particular, various individual components of a channel are monitored and measured to determine the utilization of each particular component. Further, in accordance with another aspect of the present invention, when the system is in logical partition mode, the collected measurement data reflects the utilization of the channel (or channel component) by a particular logical partition, as well as the utilization by other logical partitions in the system, which are coupled to the channel (or channel component).

Figure 1:
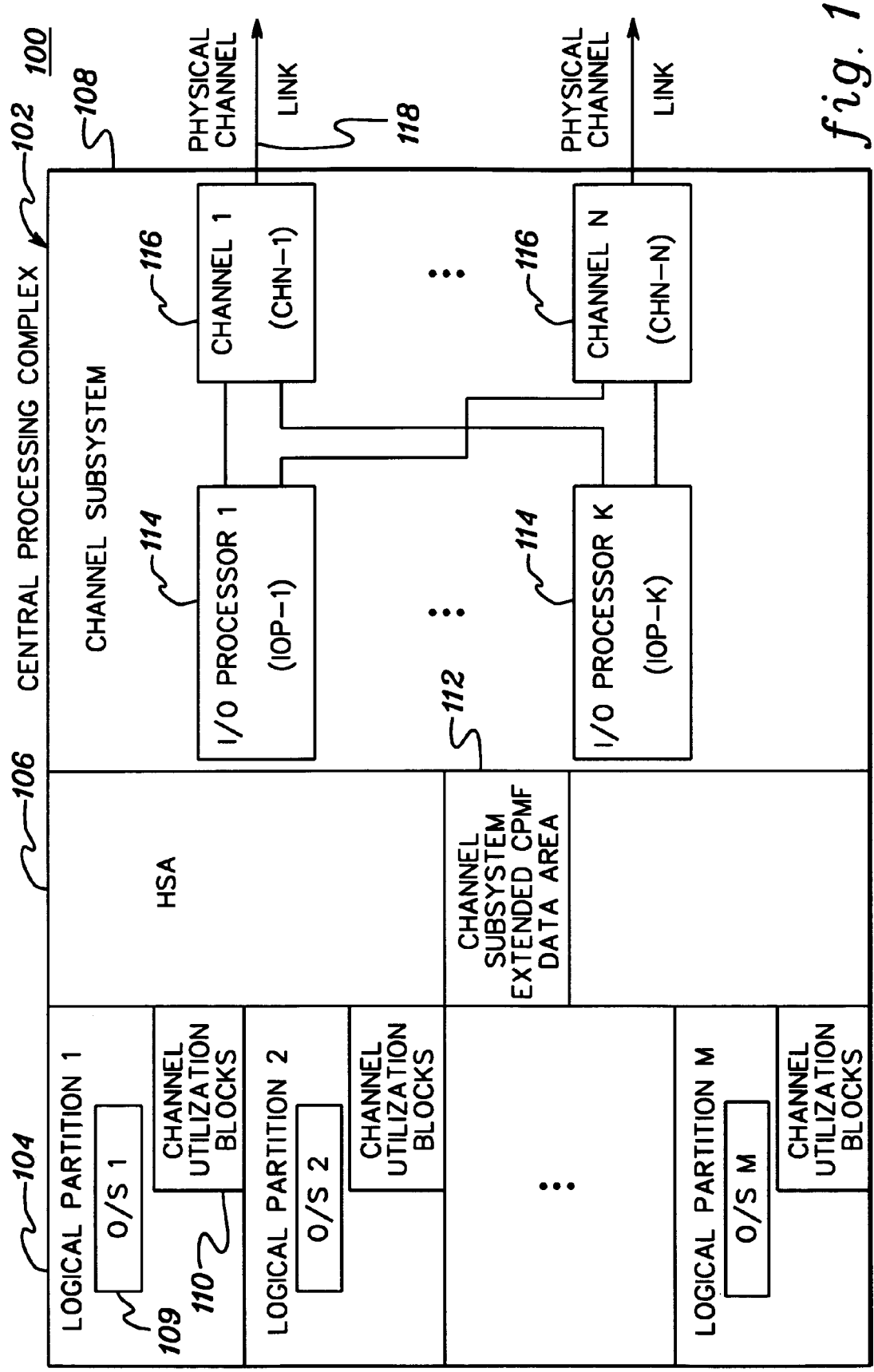
FIG. 1 depicts one example of a computing environment incorporating and using the capabilities of the present invention.

One embodiment of a computing environment incorporating and using the channel measurement capabilities of the present invention is described with reference to FIG. 1. A computing environment 100 is based, for instance, on the Enterprise Systems Architecture (ESA)/390 offered by International Business Machines Corporation, Armonk, N.Y. ESA/390 is described in an IBM publication entitled "Enterprise Systems Architecture/390 Principles of Operation," IBM Publication No. SA22-7201-06, July 1999, which is hereby incorporated herein by reference in its entirety. One example of a computing environment based on ESA/390 is the 9672 Parallel Enterprise Server offered by International Business Machines Corporation.

Computing environment 100 includes, for example, at least one central processing complex (CPC) 102 having one or more logical partitions (LPARs) 104, a hardware systems area (HSA) 106 and at least one channel subsystem 108.

The resources of the CPC are allocated to the logical partitions. In particular, each logical partition 104 has one or more logical processors (not separately shown for clarity), each of which represents all or a share of a physical processor allocated to the partition. The logical processors of a particular partition may be either dedicated to the partition (so that the underlying processor resource is reserved for that partition) or shared with another partition (so that the underlying processor resources are potentially available to another partition).

In the particular example shown, each of logical partitions 1-M functions as a separate system having a resident operating system 109 (which may differ for each logical partition). In one embodiment, the operating system is the OS/390 or MVS/ESA operating system offered by International Business Machines Corporation.

Further, each partition has a portion of the CPC's main storage resources assigned to it and included within the storage are channel utilization blocks 110. One example of a channel utilization block 110 is described with reference to FIGS. 2a–2b.

Figure 2A:
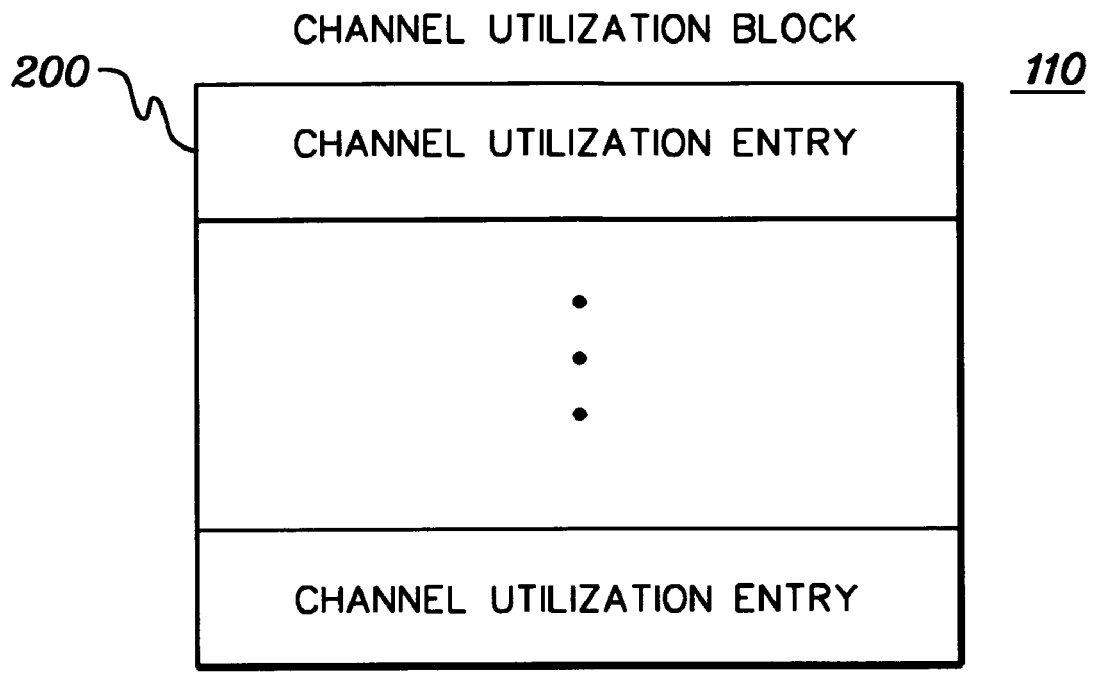
FIG. 2a depicts one example of a channel utilization block used in accordance with an aspect of the present invention.
Figure 2B:
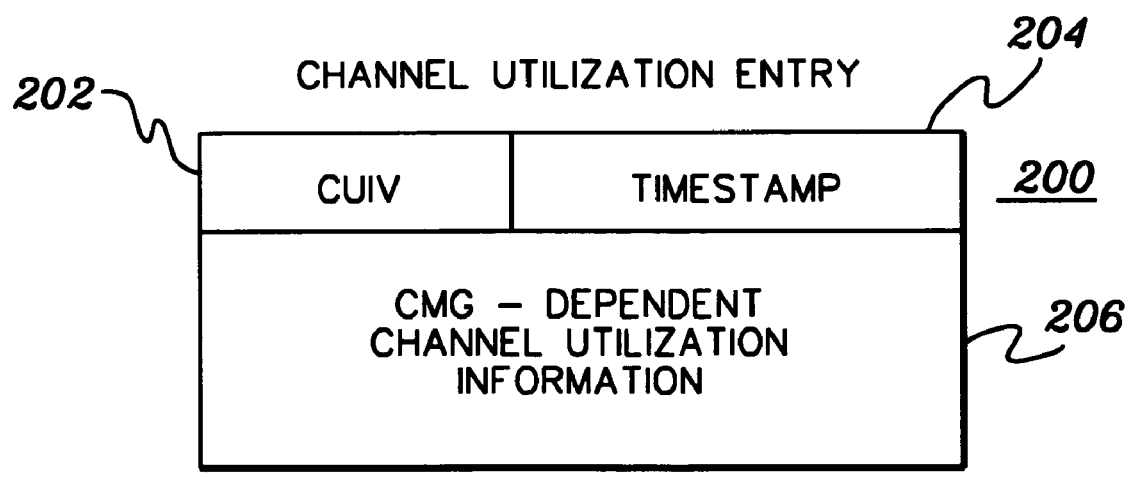
FIG. 2b depicts one example of a channel utilization entry of the channel utilization block of FIG. 2a, in accordance with an aspect of the present invention.

Referring to FIG. 2a, channel utilization block 110 includes one or more channel utilization entries 200, each of which contains the utilization information for one channel. In one example, channel utilization entry 200 includes the following fields:

(A) A channel-utilization-information validity (CUIV) map 202 that applies to the contents of the channel utilization entry. The bits of the CUIV map indicate which words of the channel utilization entry contain valid channel utilization information;

(B) A timestamp 204 that identifies when channel utilization information was last stored in the channel utilization entry; and (C) CMG-dependent channel-utilization information 206, the contents of which are dependent upon the channel measurement group (CMG) to which the channel belongs. The program can determine the CMG for a channel by executing a Store Channel Measurement Characteristics command (described below) and examining the CMG field in the channel measurement characteristics block (CMCB) (also described below) for the associated channel.

Various examples of values for CMG and the corresponding contents of fields of entry 200 include the following:

CMG=0: A value of 0 in the CMG field indicates that the channel-measurement group for the specified channel path identifier (CHPID) is unknown. The CUIV bits are zeros and the contents of the remainder of the channel-utilization entry have no meaning.

CMG=1: The CMG-dependent channel-utilization information for CMG=1 includes the following, in one example:

(A) Channel-Path-Busy Time (CPBT) (CPC): This field contains the accumulation of all measured channel-path-busy intervals for the associated channel path. The channel path is busy when it is actively communicating with an attached control unit or device.

When the CPC is operating in LPAR mode, the CPBT (CPC) value includes the channel-path-busy intervals associated with all of the logical partitions that have access to the associated channel path.

(B) Channel-Path-Busy Time: When the CPC is operating in LPAR mode, the channel path busy time contains the accumulation of measured channel-path-busy intervals for the associated channel path. The accumulation only includes intervals that are associated with the logical partition that has access to this channel utilization block. The channel path is busy when it is actively communicating with an attached control unit or device.

When the CPC is operating in basic mode (non-LPAR), the contents of this field have no meaning and the appropriate bit of the CUIV field is zero.

CMG-2: The CMG-dependent channel-utilization information for CMG=2 includes the following, in one example:

(A) Count of Bus Cycles (CPC): This field contains an accumulated count of the internal bus cycles that have been used for I/O operations on the associated channel path.

When the CPC is operating in LPAR mode, the count includes the internal bus cycles that were used for I/O operations for all logical partitions that have access to the associated channel path.

(B) Count of Channel Work Units (CPC): This field contains an accumulated count of the number of channel work units that have been performed by the associated channel path.

When the CPC is operating in LPAR mode, the count includes the channel work units that were performed for all logical partitions that have access to the associated channel path.

(C) Count of Channel Work Units: When the CPC is operating in LPAR mode, this field contains an accumulated count of the number of channel work units that have been performed by the associated channel path. The count includes only the channel work units that were performed for the logical partition that has access to this channel utilization block.

When the CPC is operating in basic mode, the contents of this field have no meaning and the appropriate bit of the CUIV field is zero.

(D) Count of Data Units Written (CPC): This field contains an accumulated count of the number of data units that have been written using the associated channel path.

The channel measurement characteristics block for the associated channel path specifies the number of bytes contained in a data unit.

When the CPC is operating in LPAR mode, the count includes the data units that were written for all logical partitions that have access to the associated channel path.

(E) Count of Data Units Written: When the CPC is operating in LPAR mode, this field contains an accumulated count of the number of data units that have been written using the associated channel path. The count includes only the data units that were written for the logical partition that has access to this channel-utilization block.

When the CPC is operating in basic mode, the contents of this field have no meaning and the appropriate bit of the CUIV field is zero.

(F) Count of Data Units Read (CPC): This field contains an accumulated count of the number of data units that have been read using the associated channel path. The channel measurement characteristics block for the associated channel path specifies the number of bytes contained in a data unit.

When the CPC is operating in LPAR mode, the count includes the data units that were read for all logical partitions that have access to the associated channel path.

(G) Count of Data Units Read: When the CPC is operating in LPAR mode, this field contains an accumulated count of the number of data units that have been read using the associated channel path. The count includes only the data units that were read for the logical partition that has access to this channel-utilization block.

When the CPC is operating in basic mode, the contents of this field have no meaning and the appropriate bit of the CUIV field is zero.

Figure 3:
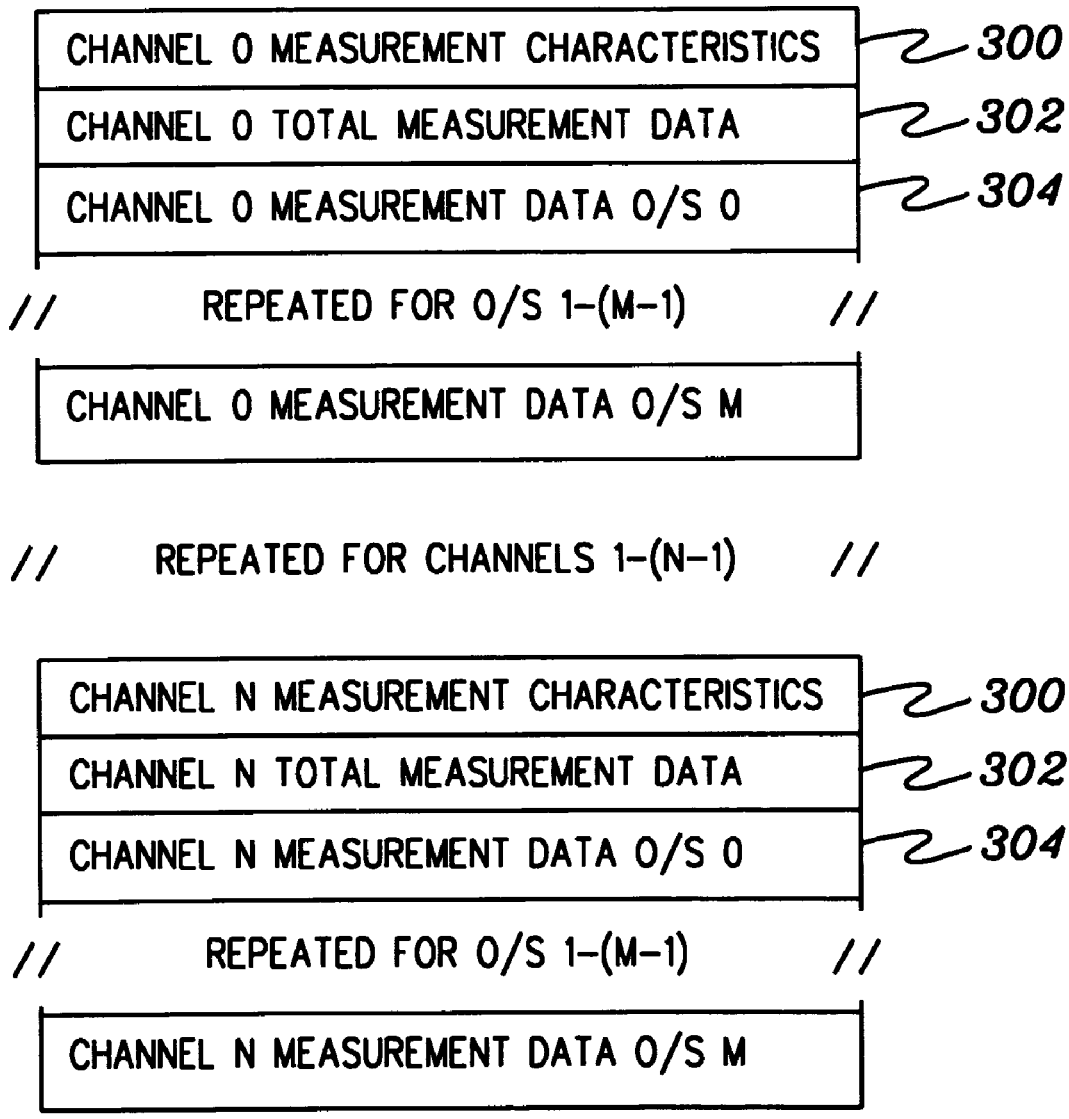
FIG. 3 depicts one example of a channel subsystem extended CPMF data area used in accordance with an aspect of the present invention.

Returning to FIG. 1, coupled to the logical partitions is a hardware systems area (HSA) 106 which, in this embodiment, includes a channel subsystem extended CPMF data area 112. The channel subsystem extended CPMF data area includes measurement information for individual channels, as described with reference to FIG. 3. In particular, for each channel, the data area includes, for instance, channel measurement characteristics 300, total measurement data 302, measurement data 304 for each particular operating system associated with the specified channel. Further details regarding these fields are provided below.

Channel measurement characteristics 300 of a channel include, for example, maximum bus cycles specifying the maximum internal bus cycles per second, available for I/O operations on the specified channel path; maximum channel work units specifying the maximum number of channel work units that can be performed per second by the specified channel paths; maximum write data units specifying the maximum number of data units that can be written per second using the specified channel path; maximum read data units specifying the maximum number of data units that can be read per second using the specified channel path; and data unit size specifying the number of bytes of data that are contained in the data unit for the specified channel path.

Total measurement data 302 includes the total measurements for specified characteristics of a channel. In one example, the total measurement data includes the total bus cycles, the total work units, the total written data units and the total read data units, as explained further below.

Additionally, the channel measurement data per operating system includes the measurements of the specified characteristics on a per operating system basis.

Referring again to FIG. 1, also coupled to the HSA is channel subsystem 108, which is used in communicating with input/output (I/O) devices. Channel subsystem 108 directs the flow of information between the input/output devices and main storage. It relieves the central processing units of the task of communicating directly with the input/output devices and permits data processing to proceed concurrently with input/output processing.

In one embodiment, channel subsystem 108 includes one or more I/O processors 114 coupled to one or more channels 116. Further, coupled to each channel is a physical channel link 118 that is used to communicate with the I/O devices. In particular, in one example, the link couples the channel to a control unit, which is further coupled to one or more I/O devices.

Figure 4:
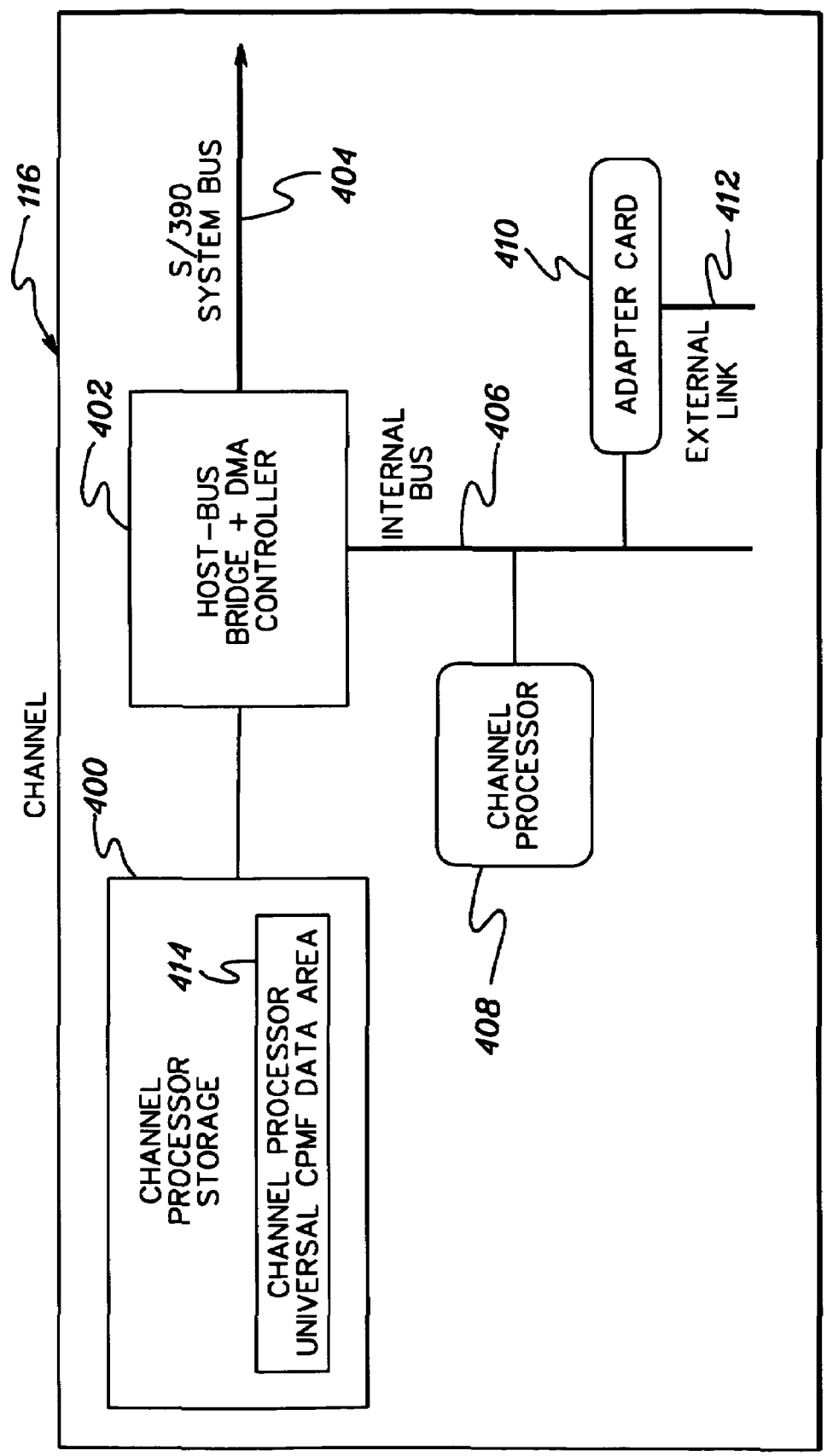
FIG. 4 depicts one embodiment of various components of a channel of FIG. 1, in accordance with an aspect of the present invention.

Further details regarding a channel are described with reference to FIG. 4. In one embodiment, each channel 116 includes, for instance, a channel processor storage 400 coupled to a host-bus bridge and DMA controller 402 for providing access, via a system bus 404, to the operating system and other components of the CPC. Additionally, coupled to the host-bus bridge and DMA controller is an internal bus 406, which is coupled to a channel processor 408 and an adapter card 410. The adapter card provides access to the I/O devices via an external link 412.

One example of a channel is a FICON channel offered by International Business Machines Corporation. One example of a FICON channel is described in "IBM S/390 FICON Implementation Guide", IBM Publication No. SG24-5169-00 (November 1999), which is hereby incorporated herein by reference in its entirety.

Figure 5:
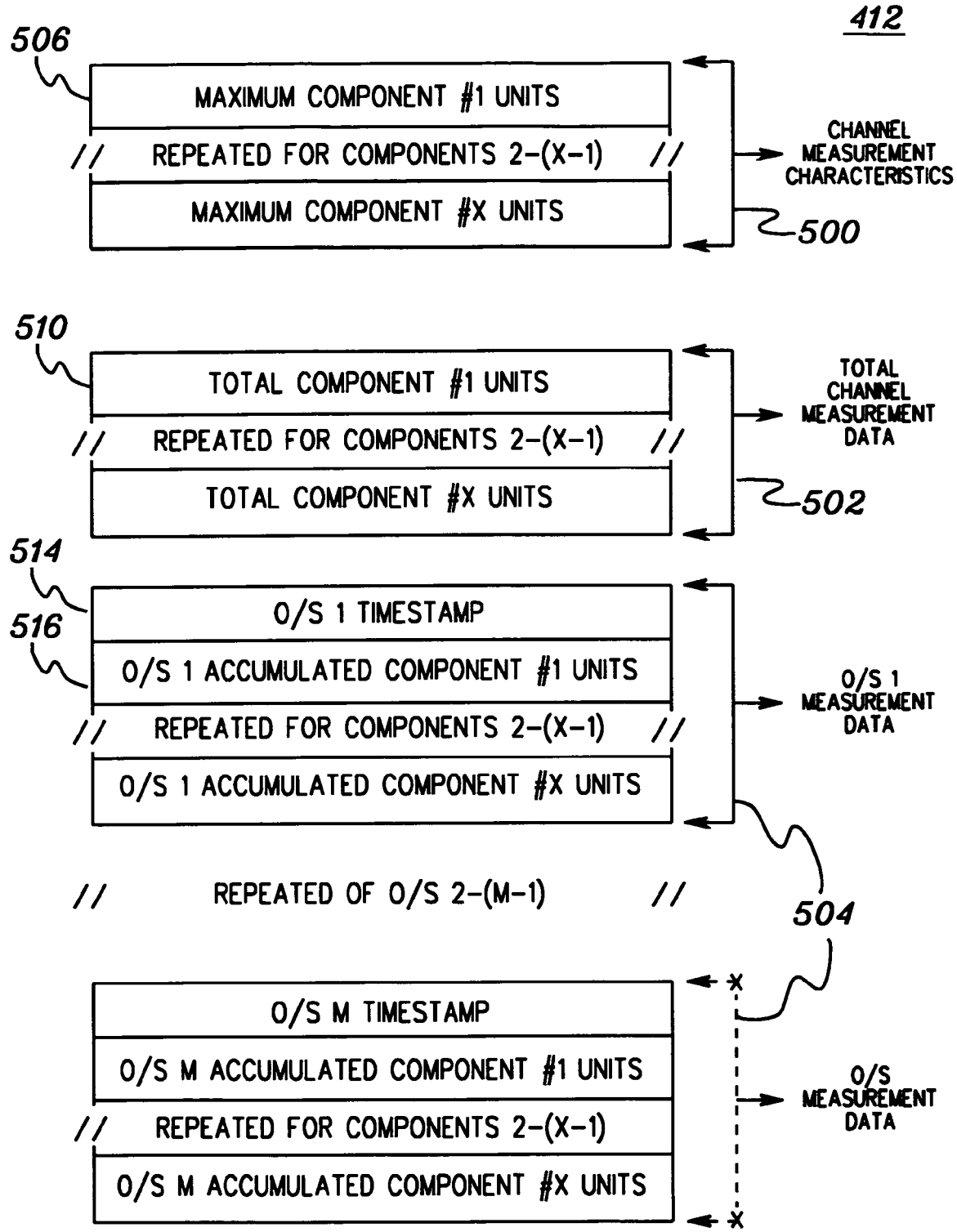
FIG. 5 depicts one example of a channel processor universal CPMF data area used in accordance with an aspect of the present invention.

In one embodiment, channel processor storage 400 includes a channel processor universal CPMF data area 414 used in storing various measurement information for the channel. As shown in FIG. 5, channel processor universal CPMF data area 412 includes, for instance, channel measurement characteristics 500, total channel measurement data 502, and measurement data 504 for each operating system coupled to the channel.

Channel measurement characteristics data 500 includes, for instance, maximum units 506 for a channel component. For example, maximum units 506 includes the maximum bus cycles (e.g., for Component 1—the internal bus) of the channel, the maximum channel work units (e.g., for Component 2—the channel processor), the maximum write data units (e.g., for Component 3—the external link), and the maximum read data units (e.g., for Component 4—the external link) for the channel.

Total channel measurement data 502 includes the total measurements for the components (e.g., the total bus cycles, total work units, total written data units and the total read data units).

Similarly, the operating system measurement data includes an operating system timestamp 514, as well as accumulated units 516 for each operating system of a component. Again, this is the accumulated information for each component.

Described in detail above is one example of a computing environment incorporating and using aspects of the present invention. The above-described environment is only one example, however. Other computing environments can be used without departing from the spirit of the invention. Further, for one or more aspects of the present invention, the computing environment need not be in logical partitioning (LPAR) mode. Basic mode (non-LPAR) can also benefit from aspects of the present invention.

Channel subsystems are further described in Casper et al., U.S. Pat. No. 5,526,484, entitled "Method and System for Pipelining the Processing of Channel Command Words," issued on Jun. 11, 1996, as well as in Galbraith et al., U.S. Pat. No. 5,265,240, entitled "Channel Measurement Method and Means," issued on Nov. 23, 1993, each of which is hereby incorporated herein by reference in its entirety.

In accordance with an aspect of the present invention, various components of the channel are individually measurable. These components include, for instance, internal bus 406, channel processor 408, and external link 412. By measuring these components individually, specific information about the individual components, as well as about the channel as a whole, can be gathered and employed in work management decisions, billing situations, system performance, as well as other areas.

Figure 6:
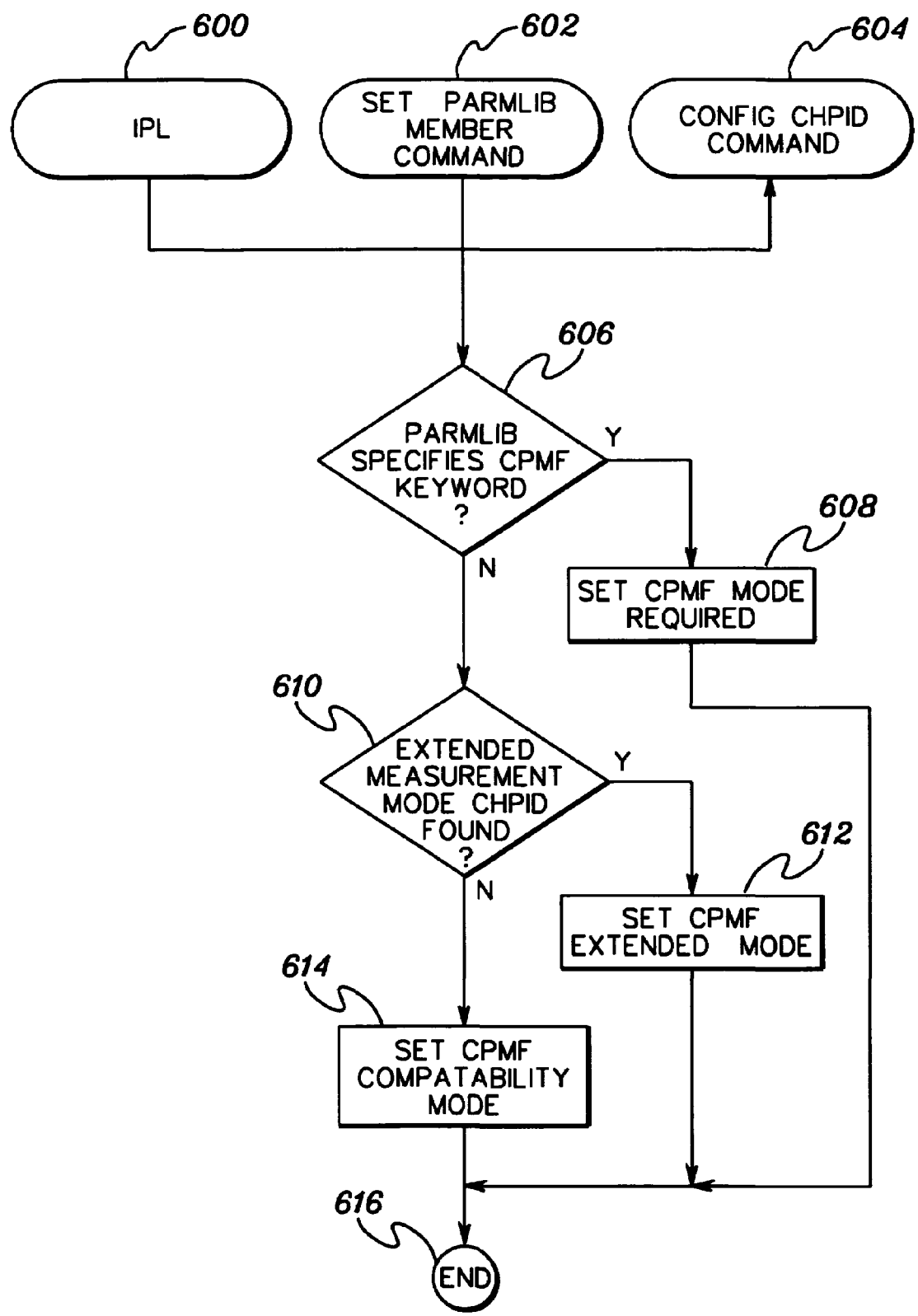
FIG. 6 depicts one embodiment of the logic used to set the appropriate mode for a channel processing measurement facility used in accordance with an aspect of the present invention.

Each of the various components is measured using a channel path measurement facility (CPMF). The channel path measurement facility may be initiated under various conditions, as described with reference to FIG. 6. As one example, the operating system may run the channel path measurement facility when an initial program load (IPL) is performed, STEP 600. As a further example, the operating system runs the channel path measurement facility when an operator selects an SRM parmlib member using an OS/390 Set command, STEP 602. As a further example, the operating system may run the channel path measurement facility when an operator configures a channel path (CHPID) online, STEP 604.

Regardless of the triggering event for initiating the channel path measurement facility, a determination is made as to whether the parmlib specifies a channel path measurement facility (CPMF) keyword, INQUIRY 606. In particular, a decision is made as to whether the systems programmer chose to run with a parmlib member that specifically indicated the desired CPMF mode (e.g., compatibility mode, CPMF=COMPAT, in which the individual components are not measured; or extended mode, CPMF=EXTENDED, in which the individual components are measured in accordance with aspects of the present invention).

If the CPMF keyword was specified, then the system operates in the mode selected, STEP 608. However, if the systems programmer did not specifically set the CPMF parameter, then the operating system chooses the CPMF mode based on the set of channel path ids found in the machine. In particular, a determination is made as to whether an extended measurement mode CHPID is found, INQUIRY 610. If any of the online CHPIDs desire extended mode for gathering the performance data, then CPFM is initialized in extended mode, STEP 612. Otherwise, if no CHPIDs desiring extended mode are found, the system runs in the old compatibility mode, STEP 614. This completes initialization of the channel path measurement facility in the desired mode, STEP 616.

In one embodiment, both the compatibility mode and the extended mode can be active at the same time. That is, one facility can be activated in one mode, and another facility can be activated in another mode. This is true for both the same logical partition and across multiple logical partitions.

Figure 7:
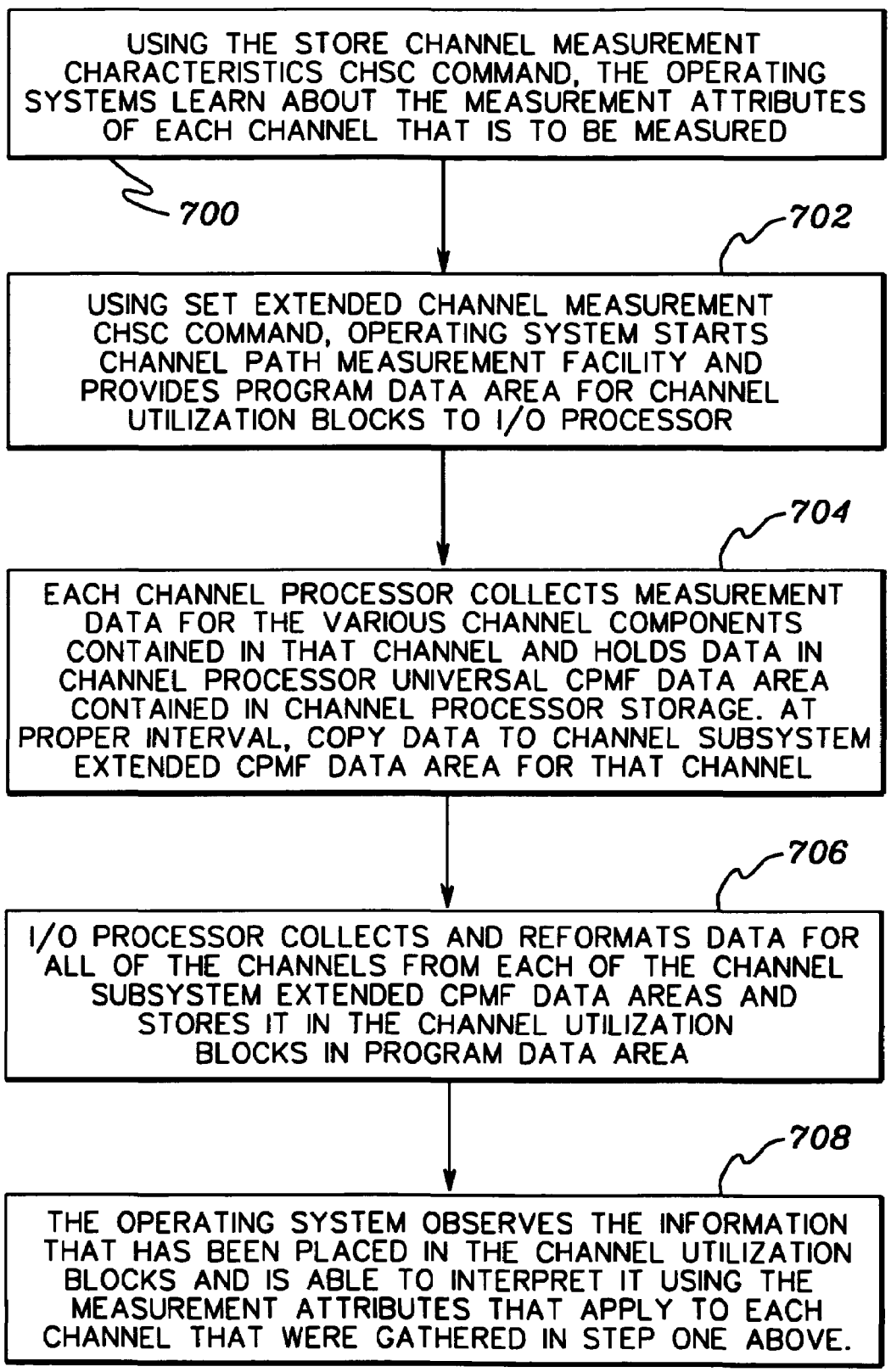
FIG. 7 depicts one embodiment of the logic associated with an overview of how to determine utilization of various components of a channel, in accordance with an aspect of the present invention.

Assuming that the channel path measurement facility is set to extended mode, the channel path measurement facility collects data on the various components of the channel, in accordance with an aspect of the present invention. An overview of one embodiment of the logic employed to collect the various data is described with reference to FIG. 7.

Initially, a Store Channel Measurement Characteristics CHSC command is used by the operating systems to learn about the measurement characteristics (or attributes) of each channel that is to be measured, STEP 700. That is, the operating systems learn about the characteristics of the various components of the channel to be measured. In one example, the measurement characteristics include the maximum bus cycles, which is an attribute of internal bus 406 (FIG. 4); maximum channel work units, which are attributes of channel processor 408; and maximum written/read data units, which are attributes associated with external link 412. Further, the characteristics include the data unit size.

In addition to using the Store Channel Measurement Characteristics CHSC command to learn about the measurement attributes, a Set Extended Channel Measurements CHSC command (described below) is used by the operating system to start the channel path measurement facility and to provide to the I/O processor a program data area for the channel utilization blocks, STEP 702.

Thereafter, each channel processor collects measurement data, via, for instance, the channel path measurement facility, for the various channel components contained in that channel and places the data in channel processor universal CPMF data area 414 (FIG. 4) contained in channel processor storage 400. Then, at each proper interval, the data is copied from data area 414 to channel subsystem extended CPMF data area 112 (FIG. 1) for that channel, STEP 704.

Additionally, the I/O processor collects from each of the channel subsystem extended CPMF data areas the data for all of the channels, reformats it and stores it in the channel utilization blocks in the previously provided program data area, STEP 706. The operating system then observes the information that has been placed in the channel utilization blocks and is able to interpret the information using the measurement characteristics that apply to each channel that were previously gathered (in STEP 700), STEP 708. This interpreted information provides the utilization of the measured channel components.

Figure 11:
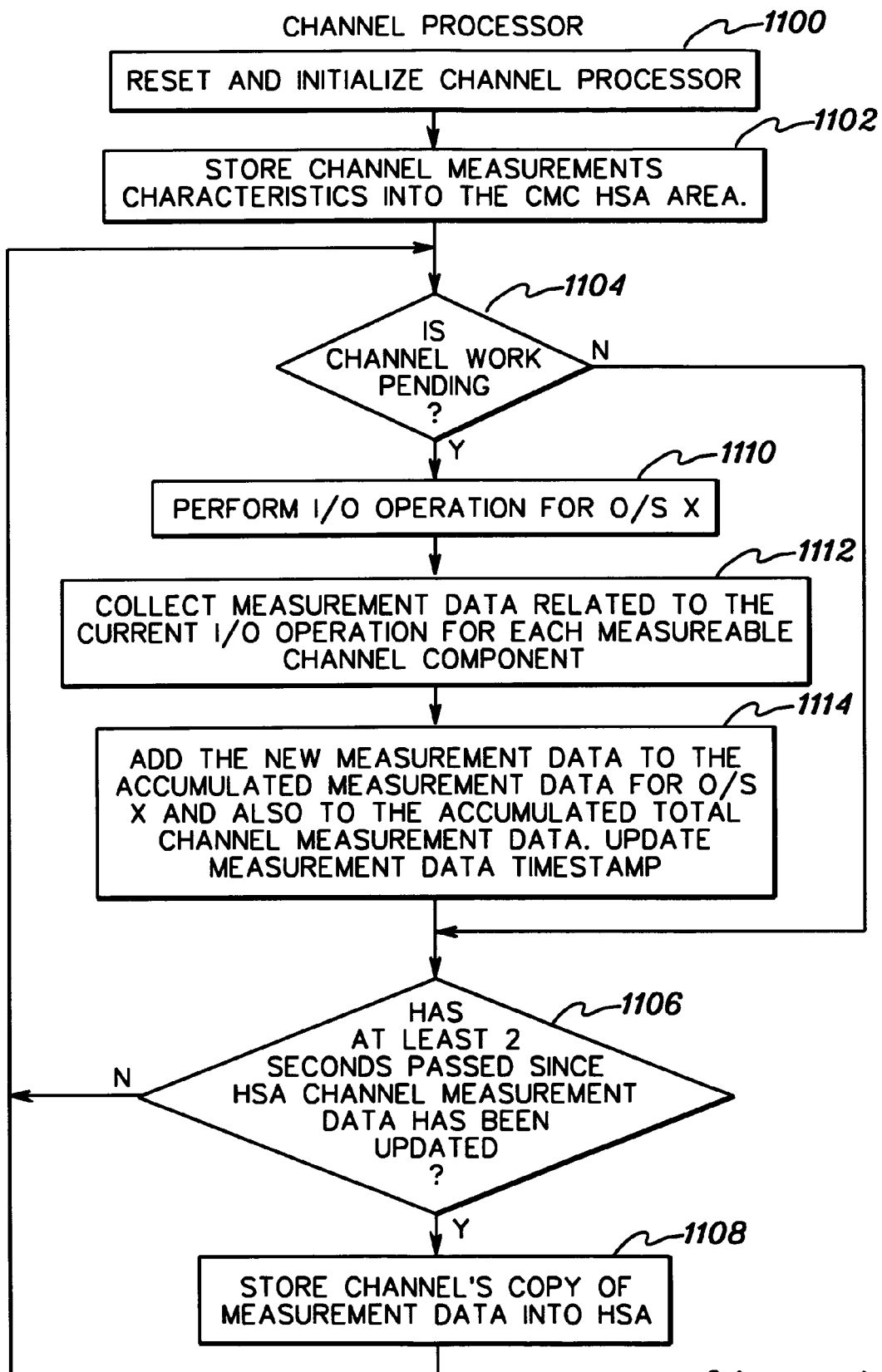
FIG. 11 depicts one embodiment of the logic associated with a channel processor collecting measurement data for one or more channel components, in accordance with an aspect of the present invention.
Figure 12:
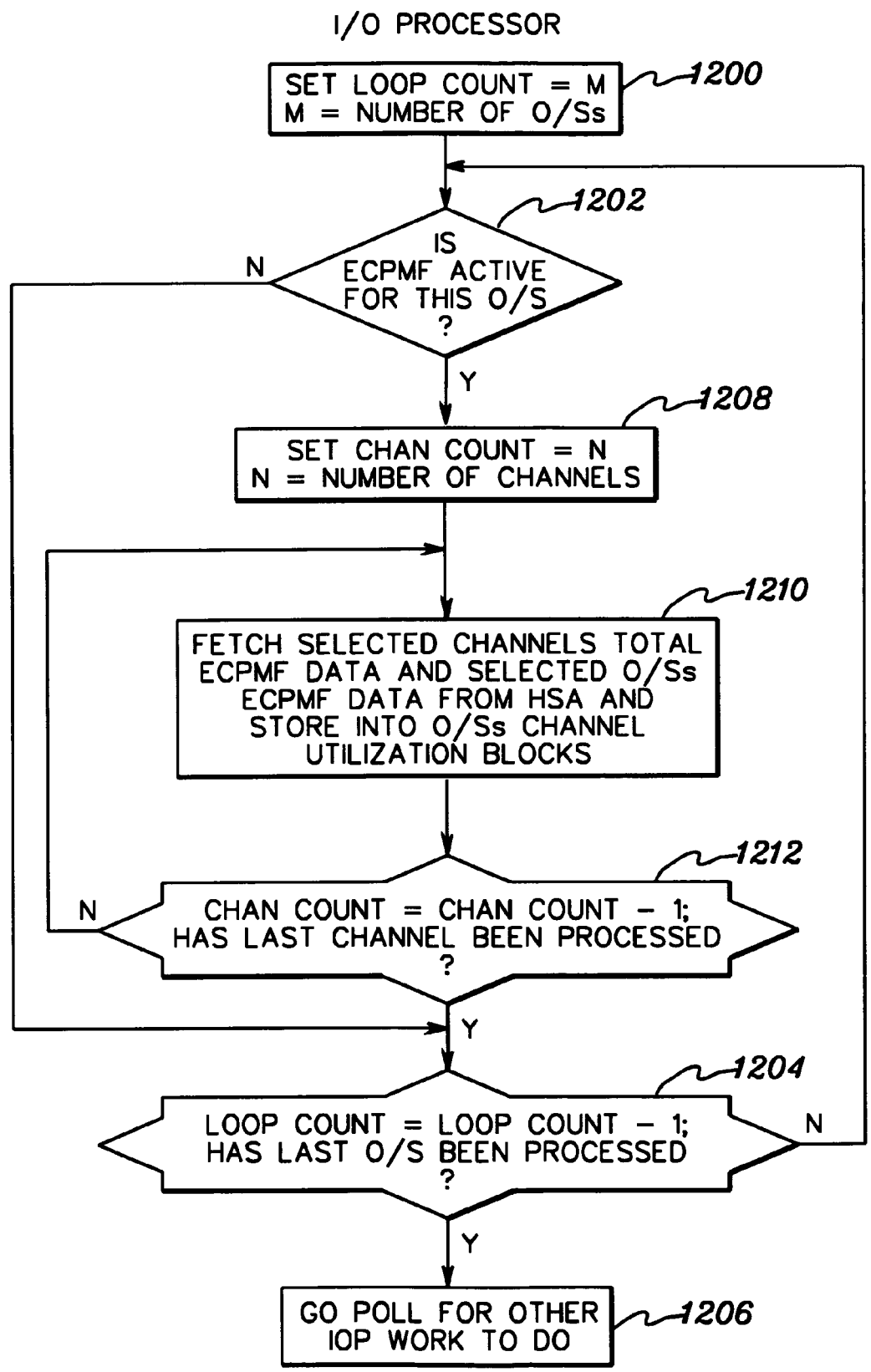
FIG. 12 depicts one embodiment of the logic associated with an I/O processor storing measurement data for one or more channel components in channel utilization blocks, in accordance with an aspect of the present invention.

Further details regarding the processing performed by the various units of the central processing complex to measure the utilization of the individual components of a channel are described with reference to FIGS. 8–12. In particular, FIG. 8 describes one embodiment of the processing performed by one or more of the operating systems; FIG. 11 depicts one embodiment of the logic performed by one or more of the channel processors; and FIG. 12 depicts one embodiment of the logic performed by one or more of the I/O processors.

Figure 8:
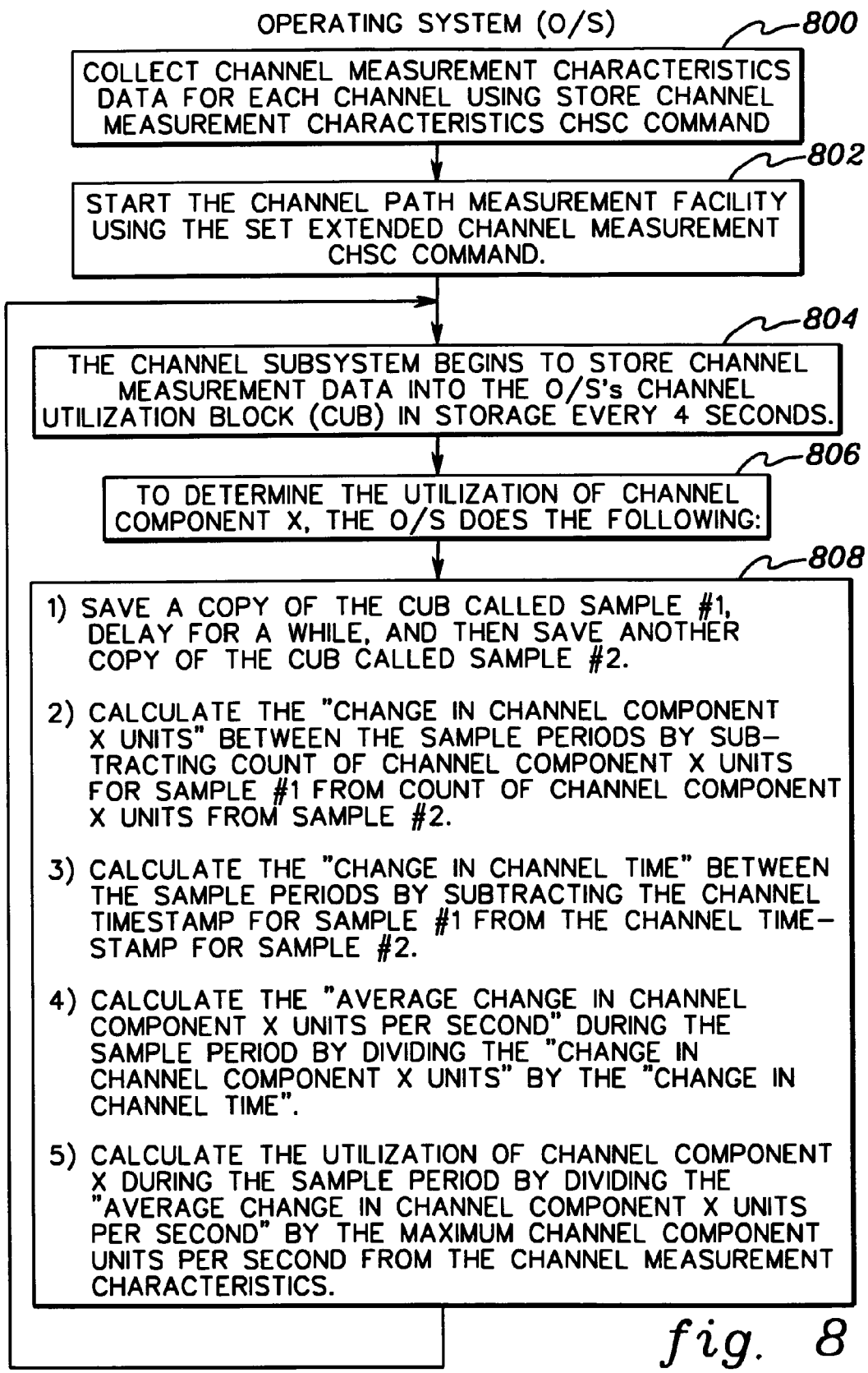
FIG. 8 depicts one embodiment of the logic associated with an operating system determining the utilization of one or more channel components, in accordance with an aspect of the present invention.
Figure 9A:
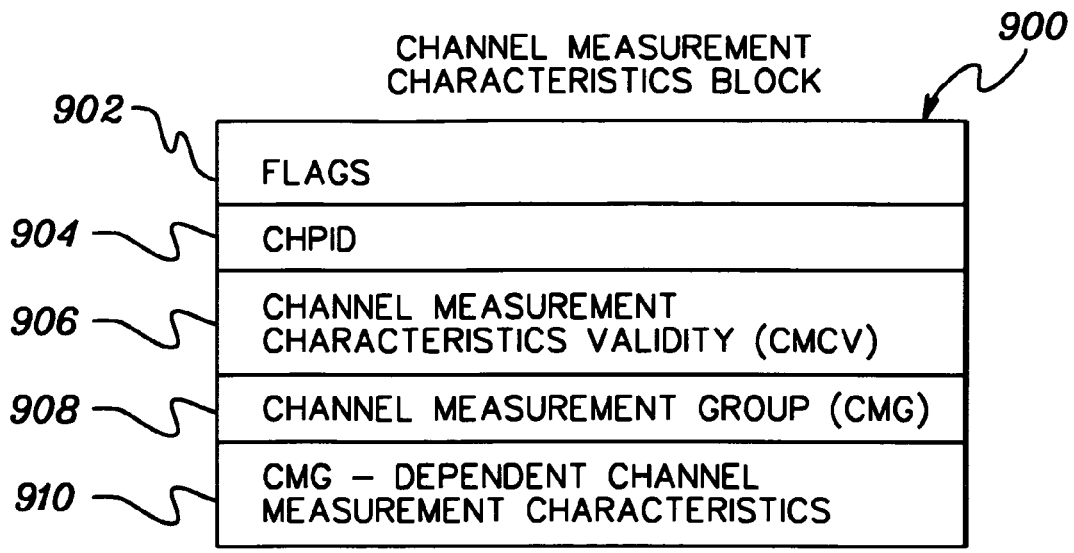
FIG. 9a depicts one embodiment of a channel measurement characteristics block used in accordance with an aspect of the present invention.
Figure 9B:
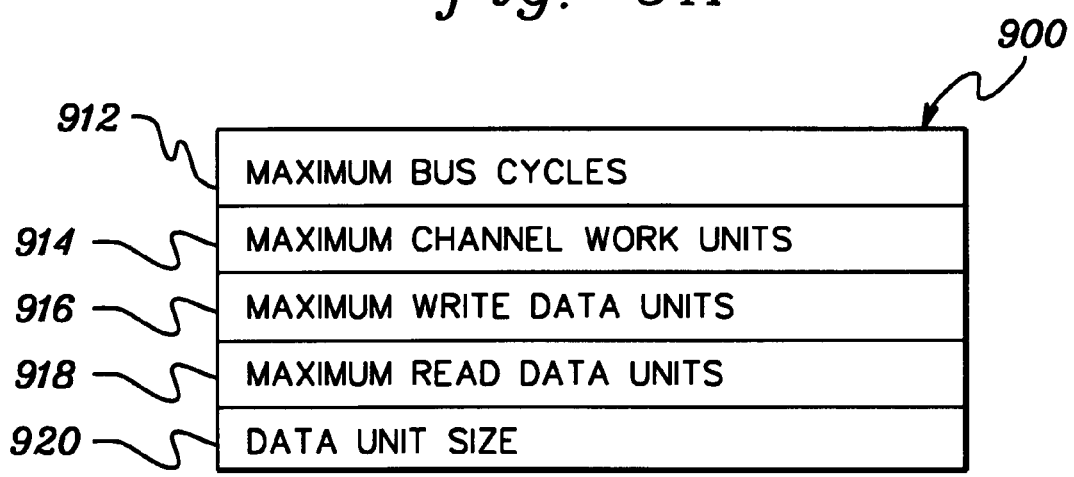
FIG. 9b depicts one example of information included in the CMG-dependent channel measurement characteristics field of the block of FIG. 9a, in accordance with an aspect of the present invention.
Figure 10:
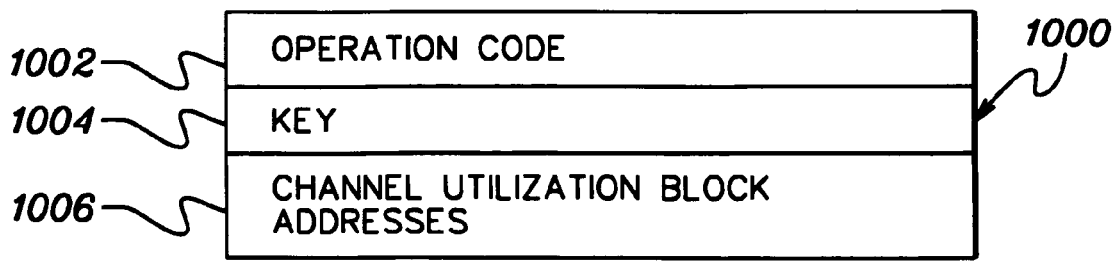
FIG. 10 depicts one example of the command request block for a Set Extended Channel Measurements command used in accordance with an aspect of the present invention.

Referring to FIG. 8, initially, the operating system collects the channel measurement characteristics data for each channel associated with that operating system, using the Store Channel Measurement Characteristics CHSC command, STEP 800. As one example, the command request block for the store command includes an op code specifying the Store Channel Measurement Characteristics command, as well as an identifier for each channel path (CHPID) for which information is requested.

In response to this request, a command response block for the Store Channel Measurement Characteristics command is provided. This response block includes, for instance, one or more channel measurement characteristics blocks. In particular, a channel measurement characteristics block may be stored for one or more of the specified CHPIDs, beginning with the CHPID specified by the first CHPID field. One example of a channel measurement characteristics block is described with reference to FIG. 9a.

In one example, a channel measurement characteristics block 900 includes, for instance, one or more flags 902, a channel path identifier (CHPID) 904, a channel measurement characteristics validity (CMCV) indicator 906, a channel measurement group (CMG) 908 and a channel measurement group-dependent measurement characteristics field 910, each of which is described below.

Flags 902 provide indicators that enable the proper interpretation of the information in the channel measurement characteristics block. As one example, flags 902 include a non-valid (N) indicator which, when zero, indicates that information is provided in the channel measurement characteristics block for the associated channel path. The CMG and CMCV fields indicate which information is provided. When one, the non-valid bit indicates that information is not provided for the associated channel path and the CMCV field is all zeros.

Flags 902 also include a shared channel path (S) indicator, which is meaningful when the N bit is zero and the CPC is operating in LPAR mode. When zero, the S bit indicates that the associated channel path is not shared between the logical partition executing the Store Channel Measurement Characteristics command and other logical partitions. When one, the S bit indicates that the associated channel path may be shared between the logical partition executing the Store Channel Measurement Characteristics command and one or more of the logical partitions.

CHPID 904 contains the channel path id of the channel path with which this channel measurement characteristics block is associated.

Channel measurement characteristics validity (CMCV) indicator, when one, indicates that the channel path measurement facility stores channel measurement characteristics information in the corresponding word of the channel measurement characteristics block. When zero, a CMCV bit indicates that the contents of the corresponding word of the channel measurement characteristics block have no meaning.

Channel measurement group (CMG) 908 specifies the measurement group to which the specified CHPID belongs. This value determines the contents and format of the CMG-dependent channel measurement characteristics area, and the format and contents of the channel utilization entry for the associated channel path, in the channel utilization block, described above.

CMG-dependent channel measurement characteristics 910 includes information which is dependent upon the value specified in the channel measurement group field. For instance, a value of zero in the CMG field indicates that the channel measurement group for the specified CHPID is unknown. Thus, the CMCV bits are zeros and the contents of block 910 have no meaning. Further, when CMG=1, the CMCV bits are zeros, and again, the contents of block 910 have no meaning.

However, when the CMG field contains a value of 2, the CMG-dependent channel measurement characteristics include, for instance, the following: maximum bus cycles 912 (FIG. 9b); maximum channel work units 914; maximum write data units 916; maximum read data units 918; and a data unit size 920, each of which is described above.

Returning to FIG. 8, in addition to collecting the channel measurement characteristics data for each channel, the operating system starts the channel path measurement facility using a Set Extended Channel Measurement CHSC command, STEP 802. The Set Extended Channel Measurement command starts or stops the channel facility based on the operation requested in the request block of the command. If the channel path measurement facility is to be started, one facility is provided, when the CPC is operating in basic mode. However, when the CPC is operating in LPAR mode, one channel path measurement facility is provided for each logical partition. The phrase "the channel path measurement facility" used herein implies the CPC channel path measurement facility, when the CPC is operating in basic mode, or the channel path measurement facility associated with the logical partition executing the command, when the CPC is operating in LPAR mode. One example of the request block used for the Set Extended Channel Measurement command is described with reference to FIG. 10.

In one example, a command request block 1000 for the Set Extended Channel Measurement command includes an operation code 1002 specifying the operation to be performed. In one example, this code may indicate a start of the channel path measurement facility for the Set Extended Channel Measurements command; a stop of the channel path measurement facility for the Set Extended Channel Measurements command; or a test of the status of the channel path measurement facility for the Set Extended Channel Measurements command.

Additionally, the command request block includes a key 1004 used by the channel path measurement facility to access the channel utilization block. Further, it includes utilization block addresses 1006. When the operation code specifies a start operation, the channel utilization block addresses contain the absolute addresses of, for instance, two 4 k-byte areas in main storage which collectively make up the channel utilization block. Each part (i.e., 4 k area) of the channel utilization block contains utilization information for a unique set of a predefined number (e.g., 128) of channel paths. When the operation code specifies a stop or a test operation, the contents of the channel utilization block address is ignored.

In response to executing the Set Extended Channel Measurement command, a response block is provided. This response block, indicates, for instance, the results of executing the Set Extended Channel Measurement command.

The channel path measurement facility provides the program (e.g., operating system) with the ability to accumulate channel path utilization information, and to accumulate the portion of shared channel path utilization attributable to a logical partition, when the CPC is operating in LPAR mode.

Returning to FIG. 8, subsequent to starting the channel path measurement facility, the channel subsystem begins to accumulate channel measurement data into the associated channel utilization block at predefined intervals (e.g., at least once every four seconds), STEP 804. One example of how this is performed is described below with reference to FIGS. 11 and 12.

Thereafter, the operating system determines the utilization of a particular channel component (such as, for instance, the channel processor, the internal bus or the external link), which is referred to herein as Component X, STEP 806.

One embodiment of how the operating system performs this determination is described with reference to STEP 808. For example, a copy of the channel utilization block, called Sample # 1, is saved. Then, after a predefined delay (e.g., 15 seconds), another copy of the channel utilization block, called Sample # 2, is also saved. Subsequently, the "change in channel Component X units" between the sample periods is calculated by subtracting the count of channel Component X units from Sample # 1 from the count of channel Component X units from Sample # 2. (For example, the count of bus cycles for the internal bus of Sample # 1 is subtracted from the count of bus cycles for the internal bus of Sample # 2. Similar computations are made for the various characteristics of the other components.)

Additionally, the "change in channel time" between the sample periods is calculated by subtracting the channel timestamp for Sample # 1 from the channel timestamp for Sample # 2. Thereafter, the "average change in channel Component X units per second" during this sample period is calculated by dividing the change in channel Component X units by the change in channel time. The utilization of channel Component X, during the sample period, is then calculated by dividing the "average change in channel Component X units per second" by the maximum channel component units per second from the channel measurement characteristics.

Subsequent to determining the utilization of a channel Component X, processing proceeds to STEP 804 in order to continue to collect and analyze data for another of the various channel components.

As mentioned above, in addition to the operating system performing tasks relevant to determining the utilization of channel components, the channel processor also performs various tasks needed to collect measurement data relating to a measurable channel component. One embodiment of the logic associated with collecting this data is described with reference to FIG. 11.

Initially, the channel processor is reset and initialized, STEP 1100. Thereafter, the channel processor stores its channel measurement characteristics (CMC) into the channel subsystem extended CPMF data area in the HSA, STEP 1102. Subsequently, a determination is made as to whether channel work is pending, INQUIRY 1104. In one example, this determination is made by checking an internal status indicator. If no work is pending, then no data need be collected, thus processing continues with INQUIRY 1106.

At INQUIRY 1106, a determination is made as to whether a predefined time period (e.g., at least two seconds) has passed since the HSA channel measurement data has been updated. If the predefined amount of time has not elapsed, then processing continues with INQUIRY 1104. However, if the predefined time interval has passed, then the channel's copy of the measurement data is stored into the HSA, STEP 1108. In particular, the data stored in the channel processor universal CPMF data area is copied to the channel subsystem extended CPMF data area. Thereafter, processing continues with INQUIRY 1104.

At INQUIRY 1104, if channel work is pending, then the requested I/O operation is performed for the specified operating system, STEP 1110. Additionally, measurement data related to the current I/O operation is collected for each measurable channel component, STEP 1112. The new measurement data is then added to the accumulated measurement data for the particular operating system and to the accumulated total channel measurement data in the channel processor universal CPMF data, STEP 1114. Additionally, the measurement data timestamp is updated. Thereafter, processing continues with INQUIRY 1106.

Processing related to the I/O processor's collection of data is described with reference to FIG. 12. Initially, a set loop count is set equal to a variable M, where M is equal to the number of operating systems, STEP 1200. Thereafter, a determination is made as to whether the extended channel-path monitoring facility is active for this operating system, INQUIRY 1202.

If the facility is not active for this operating system, then the loop count is decremented by a predefined amount (e.g., by one), and a determination is made as to whether the last operating system has been processed, INQUIRY 1204. If the last operating system has been processed, then the logic polls for other IOP work to perform, STEP 1206. Otherwise, processing continues with INQUIRY 1202 for the next operating system.

At INQUIRY 1202, if the extended monitoring facility is active for this operating system, then a channel count is set equal to a variable, N, which reflects the number of channels, STEP 1208. Thereafter, the total measurements data and the operating system measurement data for the channels in which the operating system has access are fetched from the channel subsystem extended CPMF data area of the HSA and stored into the operating system's channel utilization blocks, STEP 1210. Subsequently, the variable, channel count, is decremented by a predefined amount (e.g., one), and a determination is made as to whether the last channel has been processed, INQUIRY 1212. If the last channel has been processed, then processing continues with INQUIRY 1204. Otherwise, processing continues with STEP 1210.

Described in detail above is a measurement facility that measures utilization of individual channel components. This advantageously provides utilization information in enough detail (e.g., work units, data units written, data units read and bus cycles used) to effectively assess the workload of a channel. Advantageously, measurements are provided that are tailored to the type of channel path, and which are meaningful in determining how, and to what degree, the channel is being utilized. The utilization measurements of the present invention include information concerning both the CPC level and the single logical partition level. In addition, in one aspect of the present invention, an operating system that is executing in a logical partition under LPAR is able to observe channel path utilization for all logical partitions, as well as for its own logical partition.

Although various components are described herein, this invention is not limited to those components. Aspects of this invention are universal and can be used with a wide range of components. Further, the characteristics described herein are only examples. Other characteristics can be used without departing from the spirit of the present invention.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of determining utilization of channel components of a computing environment, said method comprising:
    obtaining individualized measurement data for each component of selected multiple components of a plurality of components of a channel; and
    using said individualized measurement data to determine utilization of each component of at least two components of said selected multiple components.

2. The method of claim 1, further comprising obtaining one or more operational characteristics of a selected component of said at least two components.

3. The method of claim 2, wherein said using further comprises employing said one or more operational characteristics to determine said utilization of said selected component.

4. The method of claim 3, wherein said obtaining measurement data comprises obtaining said measurement data at a plurality of predefined intervals, and wherein said using comprises:
    determining an average change in the measurement data over at least two intervals of said plurality of predefined intervals; and
    dividing said average change by a value of at least one of said one or more operational characteristics.

5. The method of claim 4, wherein said value is a maximum value for that operational characteristic.

6. The method of claim 2, wherein said selected component comprises an internal channel bus, and said one or more operational characteristics of said internal bus comprise a maximum number of bus cycles.

7. The method of claim 2, wherein said selected component comprises a channel processor, and said one or more operational characteristics of said channel processor comprise a maximum number of channel work units.

8. The method of claim 2, wherein said selected component comprises an external link of said channel, and said one or more operational characteristics of said external link comprise at least one of a maximum number of written data units, a maximum number of read data units, and a size of said data units.

9. The method of claim 1, wherein a component of said at least two components comprises one of an internal bus of said channel, a channel processor and an external link of said channel.

10. The method of claim 1, wherein the channel is associated with a logical partition of said computing environment involved in the determining utilization, and wherein the measurement data comprises data representative of use of a selected component of the at least two components by said logical partition.

11. The method of claim 10, wherein the measurement data is further representative of use of said selected component by one or more other logical partitions of said computing environment.

12. The method of claim 1, wherein said obtaining measurement data is performed using a channel path measurement facility executing in a first mode.

13. The method of claim 12, wherein another channel path measurement facility is activated within said computing environment in a second mode, and wherein said channel path measurement facility in said first mode and said channel path measurement facility in said second mode are concurrently active.

14. A method of obtaining information associated with channel components of a computing environment, said method comprising:
    selecting a channel within said computing environment to be monitored, said channel comprising a plurality of components; and
    obtaining individualized data for each component of at least two components of said plurality of components.

15. The method of claim 14, wherein said obtaining individualized data comprises obtaining one or more operational characteristics of said at least two components.

16. The method of claim 15, wherein at least one of said one or more operational characteristics comprises a maximal value of said operational characteristic.

17. The method of claim 14, wherein said obtaining individualized data comprises obtaining measurement data usable in determining utilization of each component of said at least two components.

18. The method of claim 14, wherein said obtaining individualized data comprises:
    obtaining one or more operational characteristics of said at least two components; and
    obtaining individualized measurement data for each component of said at least two components, wherein said one or more operational characteristics and said individualized measurement data are used to determine utilization of each component of said at least two components.

19. A method of determining utilization of channels of a computing environment, said computing environment comprising a plurality of logical partitions, and said method comprising:
    obtaining, on behalf of a logical partition involved in determining utilization of a channel, measurement data for the channel, said measurement data being representative of use of said channel by the logical partition and representative of use by one or more other logical partitions of said plurality of logical partitions; and
    using said measurement data to determine utilization of the channel.

20. A system of determining utilization of channel components of a computing environment, said system comprising:
    means for obtaining individualized measurement data for each component of selected multiple components of a plurality of components of a channel; and
    means for using said individualized measurement data to determine utilization of each component of at least two components of said selected multiple components.

21. The system of claim 20, further comprising means for obtaining one or more operational characteristics of a selected component of said at least two components.

22. The system of claim 21, wherein said means for using further comprises means for employing said one or more operational characteristics to determine said utilization of said selected component.

23. The system of claim 22, wherein said means for obtaining measurement data comprises means for obtaining said measurement data at a plurality of predefined intervals, and wherein said means for using comprises:
    means for determining an average change in the measurement data over at least two intervals of said plurality of predefined intervals; and means for dividing said average change by a value of at least one of said one or more operational characteristics.

24. The system of claim 23, wherein said value is a maximum value for that operational characteristic.

25. The system of claim 21, wherein said selected component comprises an internal channel bus, and said one or more operational characteristics of said internal bus comprise a maximum number of bus cycles.

26. The system of claim 21, wherein said selected component comprises a channel processor, and said one or more operational characteristics of said channel processor comprise a maximum number of channel work units.

27. The system of claim 21, wherein said selected component comprises an external link of said channel, and said one or more operational characteristics of said external link comprise at least one of a maximum number of written data units, a maximum number of read data units, and a size of said data units.

28. The system of claim 20, wherein a component of said at least two components comprises one of an internal bus of said channel, a channel processor and an external link of said channel.

29. The system of claim 20, wherein the channel is associated with a logical partition of said computing environment involved in the determining utilization, and wherein the measurement data comprises data representative of use of a selected component of the at least two components by said logical partition.

30. The system of claim 29, wherein the measurement data is further representative of use of said selected component by one or more other logical partitions of said computing environment.

31. A system of obtaining information associated with channel components of a computing environment, said system comprising:
means for selecting a channel within said computing environment to be monitored, said channel comprising a plurality of components; and
means for obtaining individualized data for each component of at least two components of said plurality of components.

32. The system of claim 31, wherein said means for obtaining individualized data comprises means for obtaining one or more operational characteristics of said at least two components.

33. The system of claim 32, wherein at least one of said one or more operational characteristics comprises a maximal value of said operational characteristic.

34. The system of claim 31, wherein said means for obtaining individualized data comprises means for obtaining measurement data usable in determining utilization of each component of said at least two components.

35. The system of claim 31, wherein said means for obtaining individualized data comprises:
means for obtaining one or more operational characteristics of said at least two components; and
means for obtaining individualized measurement data for each component of said at least two components, wherein said one or more operational characteristics and said individualized measurement data are used to determine utilization of each component of said at least two components.

36. A system of determining utilization of channels of a computing environment, said computing environment comprising a plurality of logical partitions, and said system comprising:
means for obtaining, on behalf of a logical partition involved in determining utilization of a channel, measurement data for the channel, said measurement data being representative of use of said channel by the logical partition and representative of use by one or more other logical partitions of said plurality of logical partitions; and
means for using said measurement data to determine utilization of the channel.

37. A system of determining utilization of channel components of a computing environment, said system comprising:
at least one processor adapted to obtain individualized measurement data for each component of selected multiple components of a plurality of components of a channel; and
at least one processor adapted to use said individualized measurement data to determine utilization of each component of at least two components of said selected multiple components.

38. A system of obtaining information associated with channel components of a computing environment, said system comprising:
a channel comprising a plurality of components; and
at least one processor adapted to obtain individualized data for each component of at least two components of said plurality of components.

39. A system of determining utilization of channels of a computing environment, said computing environment comprising a plurality of logical partitions, and said system comprising:
at least one processor adapted to obtain, on behalf of a logical partition involved in determining utilization of a channel, measurement data for the channel, said measurement data being representative of use of said channel by the logical partition and representative of use by one or more other logical partitions of said plurality of logical partitions; and
at least one processor adapted to use said measurement data to determine utilization of the channel.

40. At least one program storage device readable by a machine, tangibly embodying at least one program of instructions executable by the machine to perform a method of determining utilization of channel components of a computing environment, said method comprising:
obtaining individualized measurement data for each component of selected multiple components of a plurality of components of a channel; and
using said individualized measurement data to determine utilization of each component of at least two components of said selected multiple components.

41. The at least one program storage device of claim 40, wherein said method further comprises obtaining one or more operational characteristics of said selected component.

42. The at least one program storage device of claim 41, wherein said using further comprises employing said one or more operational characteristics to determine said utilization of said selected component.

43. The at least one program storage device of claim 42, wherein said obtaining measurement data comprises obtaining said measurement data at a plurality of predefined intervals, and wherein said using comprises:
determining an average change in the measurement data over at least two intervals of said plurality of predefined intervals; and
dividing said average change by a value of at least one of said one or more operational characteristics.

44. The at least one program storage device of claim 40, wherein a component of said at least two components comprises one of an internal bus of said channel, a channel processor and an external link of said channel.

45. The at least one program storage device of claim 40, wherein the channel is associated with a logical partition of said computing environment involved in the determining utilization, and wherein the measurement data comprises data representative of use of a selected component of the at least two components by said logical partition.

46. The at least one program storage device of claim 45, wherein the measurement data is further representative of use of said selected component by one or more other logical partitions of said computing environment.

47. An article of manufacture, comprising:
  at least one computer usable medium having computer readable program code means embodied therein for causing the obtaining of information associated with channel components of a computing environment, the computer readable program code means in the article of manufacture comprising:
  computer readable program code means for causing a computer to select a channel within said computing environment to be monitored, said channel comprising a plurality of components; and
  computer readable program code means for causing a computer to obtain individualized data for each component of at least two components of said plurality of components.

48. The article of manufacture of claim 47, wherein said computer readable program code means for causing a computer to obtain individualized data comprises computer readable program code means for causing a computer to obtain one or more operational characteristics of said at least two components.

49. The article of manufacture of claim 47, wherein said computer readable program code means for causing a computer to obtain individualized data comprises computer readable program code means for causing a computer to obtain measurement data usable in determining utilization of each component of said at least two components.

50. The article of manufacture of claim 47, wherein said computer readable program code means for causing a computer to obtain individualized data comprises:
  computer readable program code means for causing a computer to obtain one or more operational characteristics of said at least two components; and
  computer readable program code means for causing a computer to obtain individualized measurement data for each component of said at least two components, wherein said one or more operational characteristics and said individualized measurement data are used to determine utilization of each component of said at least two components.

51. At least one program storage device readable by a machine, tangibly embodying at least one program of instructions executable by the machine to perform a method of determining utilization of channels of a computing environment, said computing environment comprising a plurality of logical partitions, and said method comprising:
  obtaining, on behalf of a logical partition involved in determining utilization of a channel, measurement data for the channel, said measurement data being representative of use of said channel by the logical partition and representative of use by one or more other logical partitions of said plurality of logical partitions; and
  using said measurement data to determine utilization of the channel.

* * * * *